United States Patent [19]
Henderson et al.

[11] Patent Number: 5,129,873
[45] Date of Patent: Jul. 14, 1992

[54] EXERCISE APPARATUS

[75] Inventors: William C. Henderson, Bellingham; Paul T. Dunham, Everett, both of Wash.

[73] Assignee: Precor Incorporated, Bothell, Wash.

[21] Appl. No.: 559,633

[22] Filed: Jul. 30, 1990

[51] Int. Cl.⁵ ............................................. A63B 21/00
[52] U.S. Cl. ................................... 482/52; 482/127
[58] Field of Search ............... 272/70, 93, 140, 141, 272/142, 69

[56] References Cited

U.S. PATENT DOCUMENTS

| | | | |
|---|---|---|---|
| 3,628,791 | 8/1970 | Garcia | 272/70 |
| 4,684,126 | 9/1987 | Dalebout et al. | |
| 4,838,543 | 6/1989 | Armstrong et al. | 272/70 |

FOREIGN PATENT DOCUMENTS

| | | |
|---|---|---|
| 2145884 | 3/1973 | Fed. Rep. of Germany. |
| 2243794 | 3/1974 | Fed. Rep. of Germany. |
| 618118 | 8/1978 | U.S.S.R. |

OTHER PUBLICATIONS

B. F. Goodrich Torsilastic ® Springs Brochure, BFG Co. Torsilastic Spring Sales Dept 1723, 500 S. Main St Akron Ohio 44318, 1986.

Primary Examiner—Stephen R. Crow
Attorney, Agent, or Firm—Christensen, O'Connor, Johnson & Kindness

[57] ABSTRACT

An exercise apparatus having a frame (12,22,32), a pair of foot beams (38,40) pivotally mounted to the frame, and a pair of elastomeric torsion springs (100,102) for urging each of the foot beams toward an upper position. Each of the elastomeric torsion springs comprises an annular elastomeric member (110) having a central bore (112). An outer casing (104) surrounds and is attached to the exterior surface of the elastomeric member and an inner casing (114) is disposed within and attached to the side wall of the central bore. The inner casing of each spring surrounds and is attached to a support arm (42,44) extending out from the frame of the exercise apparatus, and the outer casing of each spring is received in and attached to the side wall of an aperture (120) in a foot beam. As the foot beam is caused to rotate relative to the frame, the elastomeric member is torqued. When weight is released from the foot beam, this torque urges the foot beam to rotate toward its nominal orientation until the torque is dissipated.

17 Claims, 2 Drawing Sheets

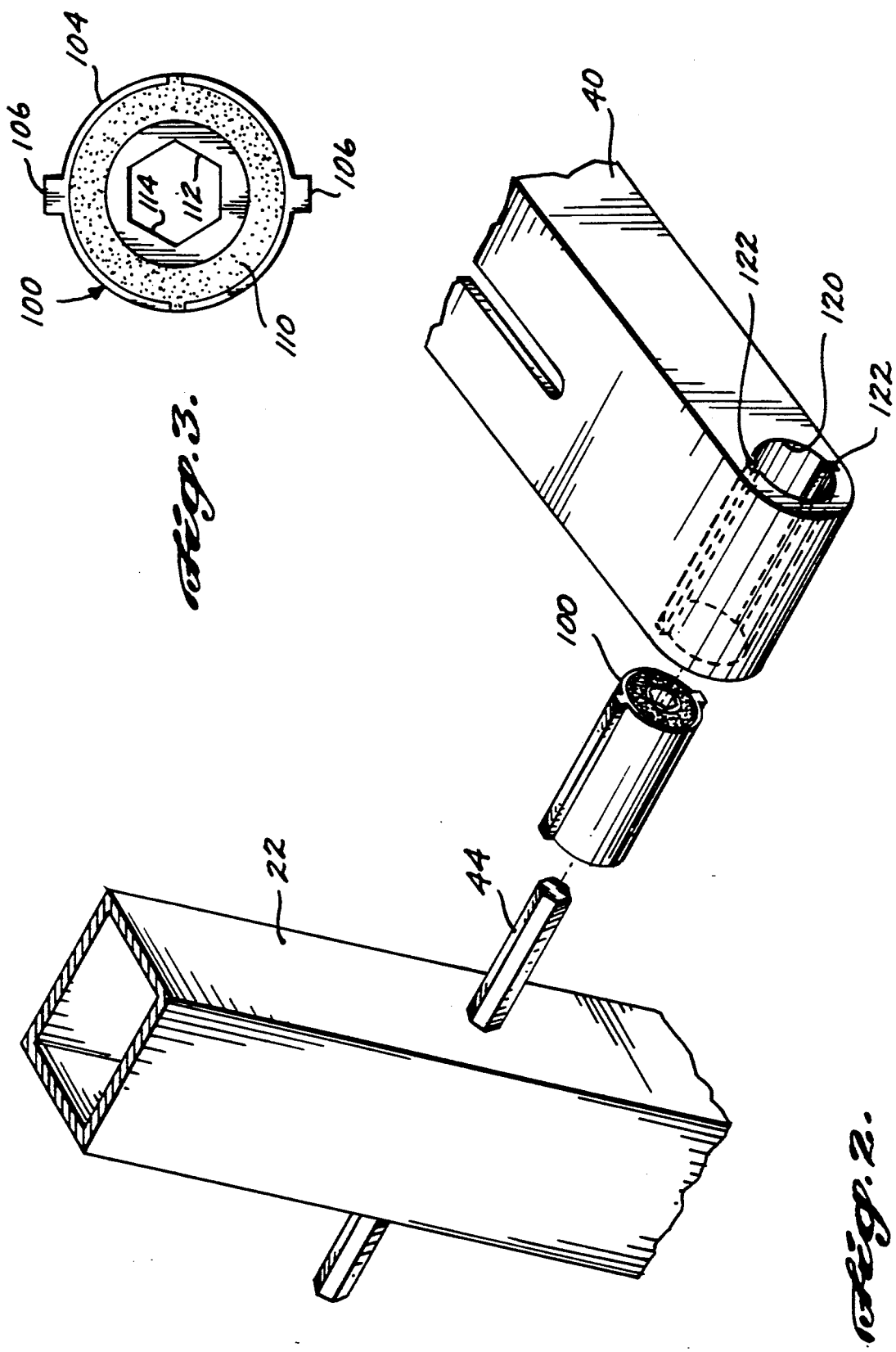

EXERCISE APPARATUS

FIELD OF THE INVENTION

The present invention relates to exercise equipment, and more particularly to exercise equipment of the type used to simulate climbing stairs or jogging.

BACKGROUND OF THE INVENTION

Exercise equipment designed to simulate climbing stairs or jogging has long been known. One known type of such exercise equipment includes a frame and two foot beams or pedals which are pivotally mounted to the frame. In this equipment, the pedals are depressed alternately as the user climbs or jogs in place. The pedals are returned to an upper, typically generally horizontal, position by one of a variety of biasing means.

One group of biasing means for returning the foot pedals to the upper position comprises a pair of coil springs, each of which are positioned beneath a respective one of the foot pedals, as disclosed in U.S. Pat. No. 3,628,791 and German Patent No. 2,243,794. The use of coil springs alone as a means for biasing the foot pedals on exercise apparatus to the upper position has been found to be undesirable because the resistance generated by the springs typically does not vary linearly with displacement of the foot pedals. Such nonlinear resistance makes it difficult to develop an even exercise cadence.

Another system for returning the foot pedals of a stair climbing exercise apparatus to the upper position is disclosed in U.S. Pat. No. 4,838,543 (the "'543 patent"). The '543 patent discloses a rope and pulley arrangement for returning the foot pedal from which the user has removed his or her weight to the upper position. The rope and pulley system comprises a pulley centrally located between and above the foot pedals and a rope trained about the pulley and attached to each of the foot pedals so that when one of the foot pedals is pressed down by the user, the rope attached thereto is pulled down which in turn causes the other end of the rope attached to the other foot pedal to be pulled up. As a result of this upward movement of the other end of the rope, the foot pedal attached thereto is moved to an upper position. Although the rope and pulley arrangement disclosed in the '543 patent functions satisfactorily, a desire exists to provide a mechanism for returning the unweighted pedal to the upper position which has a higher degree of reliability and durability than that of the rope and pulley arrangement disclosed in the '543 patent.

Torsion springs of the type comprising an elongate, metal coil spring fixed to a pivotally mounted member so that the longitudinal axis of the spring is parallel to or coaxial with the axis of rotation of the member have been used in exercise equipment for biasing various pivotally mounted lever mechanisms in a given direction and for opposing movement of such lever mechanisms in an opposite direction. For instance, U.S. Pat. No. 4,684,126 discloses a rowing exercise apparatus comprising a pair of arm levers, each having a torsion spring associated therewith for opposing movement of the arm levers in a first direction and for biasing the arm levers in an opposite direction. German Patent No. 2,145,884 discloses a foot exerciser for bedridden patients comprising two foot pedals which are pivotally mounted to a frame. The foot exerciser includes a torsion spring associated with each of the foot pedals for resisting movement of the pedals in a first direction and biasing the pedals in a second, opposite direction. Soviet Union Inventor's Certificate 618,118 discloses a gymnast's springboard comprising a pair of lever mechanisms and a pair of torsion springs associated with each of the lever mechanisms for urging the mechanisms in a first direction and opposing movement of the lever mechanisms in an opposite direction. The lever mechanisms engage a horizontal bed and urge the bed upwardly and oppose movement of the bed in a downward direction. In addition to being relatively costly, the use of elongate, metal coil springs as torsion springs in exercise apparatus for biasing lever mechanisms in a first direction tends to be undesirable due to inadequate longevity and durability of such torsion springs.

Thus, known mechanisms for returning the foot pedals of exercise apparatus to the upper position either do not function satisfactorily or lack sufficient durability and longevity.

Elastomeric torsion springs have been used in applications unrelated to exercise apparatus as a means for opposing rotation of various mechanisms in a first direction and for biasing the mechanism so as to cause it to rotate in a second, opposite direction. Such elastomeric torsion springs typically comprise an annular outer casing made from a rigid material such as steel or aluminum, an annular central member made from an elastomeric material and attached to the inside surface of the outer casing, and an inner casing which is also typically made from a rigid material such as steel or aluminum and is attached to the inner surface of the central member. In use, the inner casing is typically fixed to a first member and the outer casing is attached to a second member which is designed to pivot relative to the first member. As the second member is caused to rotate in a first direction relative to the first member, rotational force is applied to the central elastomeric member via the outer casing attached to the second member. Such rotation of the central member causes energy to be stored therein. When the second member is released the energy stored in the elastomeric central member is transmitted via the outer casing to the second member so as to cause the latter to rotate in an opposite direction relative to the first member. One such elastomeric torsion spring is distributed by B. F. Goodrich Company of Akron, Ohio, under the federally registered trademark TORSILASTIC.

BRIEF SUMMARY OF THE INVENTION

The present invention is an exercise apparatus comprising a frame, first and second foot beams, and mounting means for pivotally mounting the foot beams to the frame. The mounting means comprise a pair of elastomeric torsion springs for resisting movement of the foot beams in a downward direction and for urging the foot beams in an upward direction. Use of elastomeric torsion springs for providing such resistive and restorative forces to the foot beams is highly advantageous from the standpoint of durability, longevity, and cost.

BRIEF DESCRIPTION OF THE DRAWINGS

FIG. 2 is an exploded perspective view of a portion of the apparatus shown in FIG. 1, including the elastomeric torsion springs used for pivotally mounting the foot beams to the support frame.

FIG. 3 is a side elevation view of the elastomeric torsion springs shown in FIG. 2.

DETAILED DESCRIPTION OF THE PREFERRED EMBODIMENTS

Figure 1:
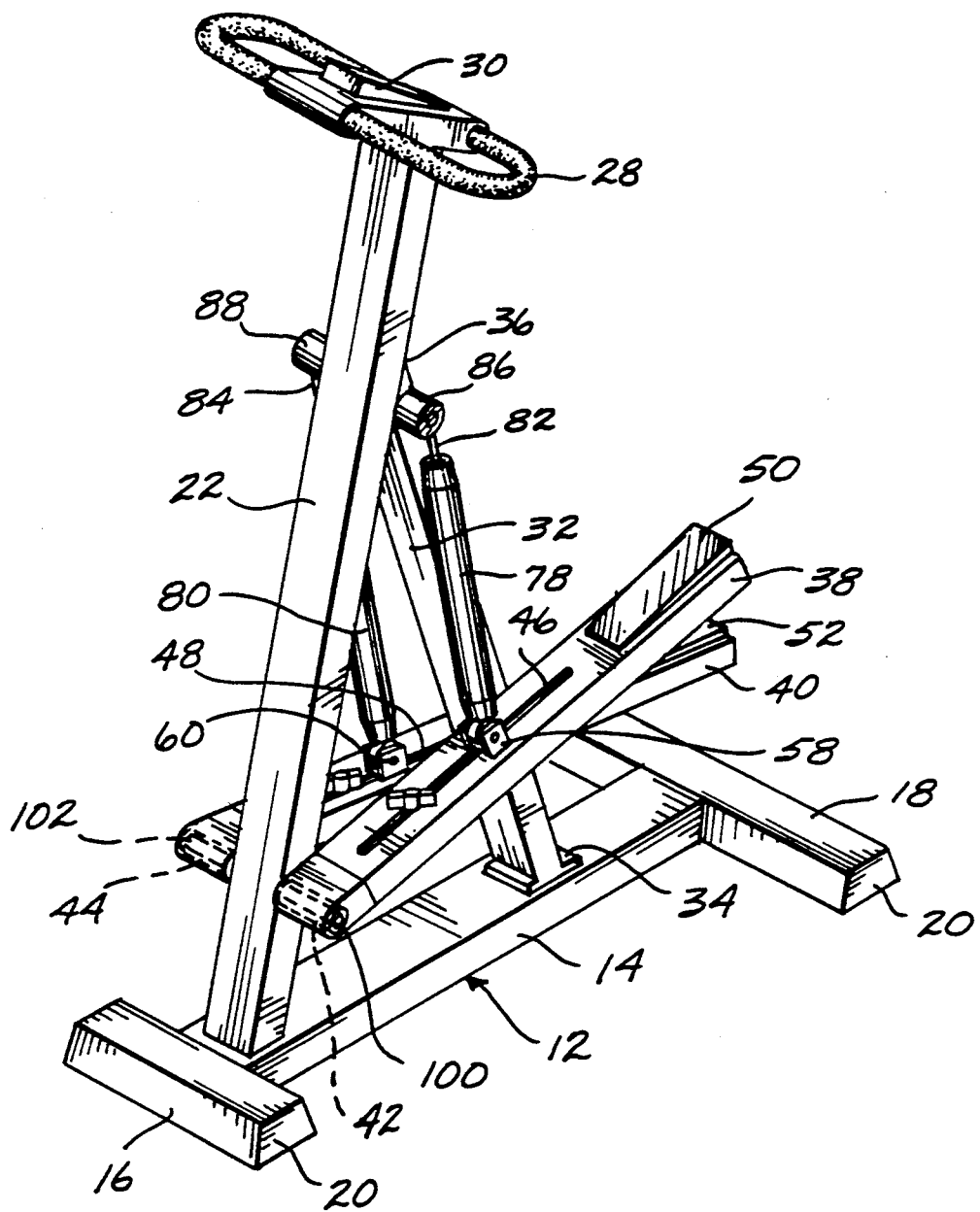
FIG. 1 is a perspective view of the exercise apparatus of the present invention.

Referring initially to FIGS. 1 and 2, a preferred embodiment of the low impact exercise equipment 10 of the present invention is disclosed. As illustrated, the equipment 10 includes a base 12 having a longitudinally extending central beam member 14 with a pair of transverse members 16 and 18 mounted at its opposite ends. It will be understood that the particular shape of the base member is not critical to the present invention, it being required only that the base provide a surface for mounting the upwardly extending members to be described hereafter, as well as providing a sufficiently long and wide footprint to prevent the equipment from tipping during use. For instance, an adequate base could be formed from a longitudinal member having but a single lateral member mounted at its rear portion below the user's feet, as long as the lateral member is sufficiently long to prevent the unit from tipping sideways during use. The laterally extending member could extend normal to the longitudinal member or at an angle thereto and could be straight or curved. Other base configurations including a box, a plate, or an A-frame having one or more transverse beams extending between diverging longitudinally extending beams could also be used.

In the preferred embodiment illustrated, the support frame is formed of tubular metallic material, and end plugs or caps 20 are provided to close the ends of the tubular sections. Tubular members of other material composition or differing configuration could also be satisfactorily used.

As illustrated in FIGS. 1 and 2, a first upwardly extending beam member 22 is shown mounted immediately rearward of forward transverse base beam 16. As illustrated, member 22 includes a foot pad 24 fixed thereto by welding or the like, which pad includes a pair of openings positioned above cooperating slots or openings in beam 14, in which conventional fasteners are positioned to hold member 22 to longitudinal beam 14. Upwardly extending member 22 may be connected to the beam 14 by any other conventional means including welding.

As illustrated, beam 22 extends to a point upwardly and rearwardly from its mounting point on beam 14 and includes a handgrip member 28 at its upper end. Handgrip member 28 includes a pair of laterally extending loops, portions of which are adapted to be gripped by the user during exercise. Alternatively, any conventional handgrip, including a bicycle type handlebar, may be satisfactorily used. An electronic package 30 including a readout screen is shown positioned in the central portion of handgrip 28 where it can be readily viewed by the user of the equipment. Electronic readouts, in general, are known on exercise equipment, and such readout is not considered to be a novel portion of the present invention.

Also extending upwardly from longitudinal beam member 14 from a point rearward of the mounting point of the first upwardly extending member 22 is a second structural member 32. Member 32 extends from baseplate 34 to intersect beam member 22 at a point 36 between its upper and lower ends. From a structural point of view, member 32 acts as a buttress to support upwardly extending member 22. It has been found that the disclosed arrangement of a stable base, a first member extending to a point upwardly and rearwardly of its base connection, and a buttress member extending to a point upwardly and forwardly from its mounting point on the base beam 14 to interconnect with the main beam between its ends, forms a highly advantageous frame structure for the presently described equipment which provides not only strength and durability, but also functions in an efficient manner to support the movable elements of the exercise equipment to be described hereafter.

It will be understood that while upwardly extending members 22 and 32 are illustrated in the drawings as straight, beam 22 may be curved rearwardly along its length either immediately from baseplate 24 or from a point along its length after extending a distance upwardly. Similarly, member 32 may extend upwardly from the base for distance and then curve at any desired angle to interconnect with member 22 between its ends. The specific shape of the beams is not critical as long as they accomplish the functions described herein.

The interconnection between members 32 and 22 is preferably made by bolting through a cushioning gasket, disposed therebetween, not shown, but it will be understood that the pieces may be welded together or otherwise fastened together in any conventionally known manner.

Referring again to FIGS. 1 and 2, foot beams 38 and 40 are shown pivotally mounted on support arms 42 and 44, as described in greater detail below. Arms 42 and 44 are attached to and cantilever outwardly from the lower end of member 22 in directions opposite one another and extending perpendicular to the longitudinal axis of member 22. As shown, foot beams 38 and 40 are formed of a hollow tubular construction and include longitudinally extending slots 46 and 48 in their top surface. These slots are adapted to receive means for mounting one end of the resistance means to be described hereafter. The beams also include nonskid foot pads 50 and 52 mounted on their upper surface distal from their pivotal connection to support arms 42 and 44. The foot pads generally locate the area upon which a user stands when exercising with the presently disclosed apparatus. Cushioning pads (not shown) are mounted beneath the beams near the ends to cushion contact of the ends of the beams with laterally extending base beam 18 when the foot beams are pivoted downwardly into contact therewith, either during use of the equipment or when a user dismounts.

Shock absorber mounting bracket assemblies 58 and 60 are shown slidably mounted in slots 46 and 48 of the foot beams. Bracket assemblies 58 and 60 are designed to couple the lower ends of shock absorbers 78 and 80, respectively, with foot beams 38 and 40. Ideally, bracket assemblies 58 and 60 are identical to the bracket assemblies used to mount the shock absorbers of the exercise apparatus disclosed in U.S. Pat. No. 4,838,543 to the foot pedals of the apparatus. For a more detailed description of assemblies 58 and 60, attention is directed to U.S. Pat. No. 4,838,543 which is incorporated herein by reference.

As noted above, the equipment 10 includes linearly operable resistance, means such as shock absorbers 78 and 80. The lower ends of the latter extend between the bracket assemblies 58 and 60 mounted to the foot beams and a mounting point on the support frame thereabove. The upper ends of piston rods 82 and 84 of shock absorbers 78 and 80, respectively, are attached via bracket assemblies 86 and 88 to upwardly extending beam member 22. Again, reference should be made to U.S. Pat. No. 4,838,543 for a more detailed description of the interconnection of shock absorbers 78 and 80 with foot beams 38 and 40 and the beam member 22.

Referring to FIGS. 1-3, apparatus 10 includes elastomeric torsion springs 100 and 102 for pivotally mounting foot beams 38 and 40 on support arms 42 and 44 which, as noted above, are shown as attached near the lower end of upwardly extending beam member 22. Ideally, the elastomeric torsion springs 100 and 102 are identical to one another and, as described with respect to spring 100 illustrated in FIGS. 2 and 3, include a hollow, essentially cylindrical outer casing 104 having diametrically opposed, radially projecting keys 106 extending along the casing. Spring 100 additionally includes an annular elastomeric member 110 which is securely bonded or otherwise securely attached to the inner surface of outer casing 104. Elastomeric member 110 includes a central bore 112 which has a predetermined, e.g., hexagonal, cross-sectional configuration. Spring 100 further comprises a hollow, cylindrical inner casing 114 having a size and cross-sectional configuration corresponding to that of bore 112 in elastomeric member 110. Inner casing 114 is bonded or otherwise securely attached to the side walls of bore 112. Preferably, outer casing 104 and inner casing 114 are made from a rigid, high-strength material such as steel or aluminum. The specific composition of elastomeric member 110 will vary depending upon the desired resistive and restorative forces to be applied by the torsion springs 100 and 102 to foot pedals 38 and 40, as described in greater detail hereinafter. However, a synthetic rubber compound is typically used for elastomeric member 110.

Support arms 42 and 44 and foot beams 38 and 40 are designed to be readily couplable with torsion springs 100 and 102, respectively. In this connection, ideally the diametric size and cross-sectional configuration of support arms 42 and 44 closely correspond to the internal diametric size and cross-sectional configuration of inner casing 114 of springs 100 and 102. More specifically, support arms 42 and 44 are sized and configured so that torsion springs 100 and 102, respectively, may be snugly fit onto the support arms by inserting the latter into the inner casings 114 of the torsion springs.

To facilitate attachment of foot beams 38 and 40 to torsion springs 100 and 102, respectively, the foot beams each include a keyed bore 120 adjacent the front ends (i.e., the ends pivotally mounted to upwardly extending member 22) of the foot beams. The size and cross-sectional configuration of bores 120 correspond to the exterior size and configuration of outer casing 104, whereby the foot beams may be press or snugly fit onto an associated torsion spring by inserting the latter into the bore 120 of the associated foot beam. In this regard, a pair of diametrically opposed key ways 122 are broached or otherwise formed lengthwise of the bores 120. As will be appreciated, the mating engagement of the keys 106 with the key ways 122 prevents relative rotational movement between the outer casing 104 and associated first beam bore 120. It is to be understood that the outer casing 104 and the beam bore 120 may be of other configurations without departing from the spirit or scope of the present invention.

Although torsion springs 100 and 102 are typically secured to the respective support arms 42 and 44 and foot beams 38 and 40 by a press or snugly fit engagement, it may be desirable to employ additional means for preventing relative axial movement of the torsion springs and foot beams. For instance, a large washer and screw (not shown) may be attached to the support arms, with the washer engaging the outer surface of the foot beams adjacent the bores 120 thereof and the screw being received in a threaded bore in the support arms.

In operation, it will be understood that the downward movement of a foot beam by a user placing his or her weight thereon will be resisted by the associated shock absorber 78 or 80, thus requiring the user to do work to overcome the resistive force applied by the shock absorber. As a foot beam is urged downwardly by the user, the foot beam causes the outer casing 104 of the associated torsion spring to rotate about its central axis due to the keyed engagement of the outer casing with the bore 120 of the foot beam. This rotation of outer casing 104 is transmitted to elastomeric member 110 inasmuch as the elastomeric member is securely attached to the inner surface of the outer casing. However, because the elastomeric member 110 is also attached to inner casing 114, which is prevented from rotating by its fixed engagement with an associated one of the support arms 42 or 44, torque is stored in elastomeric member 110.

In the preferred embodiment of the present invention, the material for elastomeric member 110 is selected so that outer casing 104 may be rotated up to about 45° relative to inner casing 114. Furthermore, the material used for elastomeric member 110 is selected so that the torque stored in elastomeric member 110 increases substantially linearly with increases in angular rotation of outer casing 104 relative to inner casing 114. This torque stored by elastomeric member 110 must, of course, be sufficient to overcome (a) the weight of foot beams 38 and 40, and (b) the bias applied by the associated shock absorber 78 or 80 to restore the unweighted foot beam 38 or 40 to the upper position. In addition, it is preferred that elastomeric torsion springs 100 and 102 urge foot beams 38 and 40, respectively, to the upper position at a rate of speed corresponding to the speed at which a user of equipment 10 typically raises his or her feet from the lower position to the upper position. Although this rate of speed typically varies as a function of the user's cadence (i.e., steps per minute), the return rate is fast enough to not lag behind the speed at which the exerciser raises his feet when simulating stair climbing, even at a rapid pace. In this regard, the return of the foot beams is typically about 20 degrees/second to about 90 degrees/second. Of course, due to the design of equipment 10, foot beams 38 and 40 never rotate more than about 45° in a given direction of travel. In the preferred embodiment of the invention, the composition of elastomeric member 110 is selected so that the latter will generate a torque of about 1000 inch-pounds when outer casing 104 has been rotated about 45° relative to inner casing 114.

Once the user has released his or her weight from a given one of foot beams 38 or 40, the torque stored in elastomeric member 110 will urge the outer casing 104 attached to the elastomeric member in a direction opposite that in which the outer casing was caused to rotate when the foot beam was depressed. Such rotation of outer casing 104 causes the foot beam attached thereto via the keyed engagement of the outer casing with the bore 120 of the foot beam to move upwardly until all of the stored torque in the elastomeric member has been dissipated. As the foot beam is urged upwardly by the associated torsion spring, the foot beam drives the lower housing of the associated shock absorber 78 or 80 upwardly toward its attachment point to frame member 22. Thus, the restorative force applied by elastomeric member 110 must be sufficient to overcome the weight of the associated foot beam as well as any resistive force generated by the associated shock absorber.

Because elastomeric torsion springs 100 and 102 are relatively mechanically uncomplicated in design, and because the torsion springs are made from extremely durable materials, the elastomeric torsion springs have exceptional longevity. As such, an exercise apparatus equipped with torsion springs 100 and 102 as the means for restoring the foot beams to the upper position will tend to operate for a much greater period of time without malfunction than exercise apparatus using other means for restoring the foot beams to the upper position.

Although equipment 10 of the present invention uses elastomeric torsion springs 100 and 102 to return foot beams 38 and 40 to the upper position, it should be appreciated that springs 100 and 102 may be used on other exercise equipment having pivotally mounted members to return the members to selected positions. For instance, springs 100 and 102 could be used in a rowing exercise machine of the type having opposed, elongate, pivotally mounted arm levers to return the arm levers to a forward position.

Furthermore, although equipment 10 has been described as comprising a pair of torsion springs, one for each of the foot beams, alternatively a single annular elastomeric member having a single inner casing and a pair of outer casings attached to the outer surface of the elastomeric member in mutually spaced relation may be used. In such an alternative embodiment, the inner casing is coupled to the frame of the exercise apparatus and one of the outer casings is coupled with one of the foot beams, in the manner described above, and the other outer casing is coupled with the other foot beam, also as described above.

Although the present invention has been disclosed with respect to a preferred embodiment and several modifications thereto, further modifications will be apparent to those skilled in the art. Accordingly, it is not intended that the invention be limited by the disclosure or by such modifications, but instead that its scope should be determined entirely by reference to the claims which follow hereinbelow.

The embodiments of the invention in which an exclusive property or privilege is claimed are defined as follows:

1. An exercise apparatus for simulating stair climbing comprising:
   a frame;
   first and second load levers;
   mounting means coupled to said frame and to said first and second load levers for mounting said first and second load levers on said frame so that each of said first and second load levers may be reciprocally pivoted about a pivot axis between a nominal position and a rotated position, and for storing energy when each of said first and second load levers is moved from its nominal position toward its rotated position and for releasing said energy, when each of said first and second load levers is permitted to move toward its nominal position, so as to urge each of said first and second load levers toward its nominal position, wherein said mounting means comprises at least one annular elastomeric member mounted about said pivot axis for storing and releasing said energy; and
   resistance means coupled to at least one of said first and second load levers to resist movement of said load levers in the direction from their nominal positions to their rotated positions.

2. An exercise apparatus according to claim 1, wherein said elastomeric member includes a central bore having an internal side wall, and said mounting means includes at least one rigid inner member disposed in said bore and attached to said side wall of said bore.

3. An exercise apparatus according to claim 2, further wherein said mounting means comprises at least one rigid outer member attached to the outer surface of said elastomeric member.

4. An exercise apparatus according to claim 3, wherein said outer member includes a radially extending projection.

5. An exercise apparatus according to claim 4 wherein said first load lever includes an aperture adjacent one end thereof having a size and cross-sectional configuration corresponding to that of said first outer member, and said second load lever includes an aperture adjacent one end thereof having a size and cross-sectional configuration corresponding to that of said second outer member.

6. An exercise apparatus according to claim 3 wherein said at least one inner member is attached to said frame and said first and second outer members are attached, respectively, to said first and second load levers.

7. An exercise apparatus according to claim 1 wherein:
   said mounting means includes first and second support arms attached to said frame;
   said one elastomeric member comprises first and second elastomeric members, each having a central bore, said first and second elastomeric members being coupled with said first and second arms, respectively, so that the radially innermost portions of said first and second elastomeric members are prevented from rotating relative to said first and second arms, respectively; and
   one end of said first and second load levers is coupled with said first and second elastomeric members, respectively, so that the radially outermost portions of said first and second elastomeric members are prevented from rotating relative to said first and second load levers.

8. An exercise apparatus according to claim 7 wherein said first and second elastomeric members each includes:
   an inner casing disposed in said central bore which (a) is fixed to the radially innermost portion of an associated one of said members and (b) surrounds and is attached to an associated one of said first and second support arms; and
   an outer casing which is attached to the radially outermost portion of an associated one of said members and to an associated one of said first and second load levers.

9. An exercise apparatus for stimulating stair climbing comprising:
   a frame including a base and first and second support arms attached to said frame so as to extend outwardly therefrom;
   first and second support beams;

a first elastomeric torsion spring including a first elastomeric member having a generally annular configuration, wherein the radially innermost portion of said first elastomeric member is attached to said first support arm and the radially outermost portion of said first elastomeric member is attached to said first support beam;

a second elastomeric torsion spring including a second elastomeric member having a generally annular configuration, wherein the radially innermost portion of said second elastomeric member is attached to said second support arm and the radially outermost portion of said second elastomeric member is attached to said second support beam, wherein each of the first and second elastomeric torsion springs are constructed and configured to store torque as the corresponding support beam is reciprocated from a nominal position to a rotated position, and to release the stored torque to urge the reciprocated corresponding support beam to the nominal position; and resistance means coupled to at least one of said first and second load levers to resist movement of said load levers in the direction from their nominal positions to their rotated positions.

10. An exercise apparatus according to claim 9, further wherein said first and second annular members each include (a) exterior and interior surfaces;

(b) a rigid outer casing attached to said exterior surface and mating with a corresponding support beam; and (c) a rigid inner casing attached to said interior surface and mating with a corresponding support arm.

11. An exercise apparatus for simulating stair climbing comprising:

a frame including a base and a first member attached to said base so as to extend upwardly from said base;

first and second foot beams for receiving the feet of an exerciser standing thereon;

mounting means coupled to said frame and to said first and second foot beams for mounting said first and second foot beams on said frame so that each of said first and second foot beams may be reciprocally pivoted about a pivot axis between an upper position and a lower portion, the improvement wherein:

said mounting means includes first and second annular elastomeric members mounted on said frame about said pivot axis and coupled with said first and second foot beams, respectively, said first and second elastomeric members being designed to (a) generate and store torque when the associated one of said first and second foot beams is moved from its upper position toward its lower position by the exerciser to simulate stair climbing and (b) to release said torque, after said first and second foot beams have been moved from said upper position toward said lower position by the user and said first and second foot beams are thereafter permitted to return to said upper position, so as to urge said first and second foot beams toward said upper position; and resistance means coupled to at least one of said first and second load levers to resist movement of said load levers in the direction from their nominal positions to their rotated positions.

12. An exercise apparatus according to claim 11, wherein the mounting means are coupled to the first member at an elevation above the base.

13. An exercise apparatus according to claim 11, further comprising handle bar means mounted on the first member, the handle bar means being manually graspable during use of the exercise apparatus.

14. An exercise apparatus according to claim 11, wherein said elastomeric members are designed to be capable of storing a quantity of energy sufficient to permit said mounting means to urge said first and second foot beams from their lower toward their upper positions at sufficient speed to coincide with the speed of the feet of the exerciser when simulating stair climbing.

15. An exercise apparatus according to claim 14, wherein the elastomeric members are capable of storing a quantity of energy sufficient to permit said mounting means to urge said first and second foot beams from their lower toward their upper positions at a rate of speed ranging from about 20 degrees/second to 90 degrees/second.

16. An exercise apparatus for simulating stair climbing comprising:

a frame;

first and second support beams pivotally mounted on the frame, each operable by an exerciser to reciprocate about a pivot axis between a first position and a second position;

resistance means coupled to at least one of the first and second support beams to resist movement of the first and second support beams from their first positions to their second positions; and first and second annular elastomeric members secured about the pivot axis between an associated one of said first and second support beams, respectively, and the frame so that each of the first and second elastomeric members is deformed to store torque as the associated support beam is moved from the first position to the second position, and releases the stored torque when the associated support beam is returned to the first position, the first and second elastomeric members each storing sufficient torque to overcome bias applied by the resistance means as the associated support beams move from the second position and to the first position to urge the associated support beam to the first position.

17. The exercise apparatus according to claim 1, wherein said mounting means is capable of storing sufficient energy to return said first and second load levers to their nominal positions after having been moved from their nominal positions and released.

* * * * *

UNITED STATES PATENT AND TRADEMARK OFFICE
CERTIFICATE OF CORRECTION

PATENT NO. : 5,129,873
DATED : July 14, 1992
INVENTOR(S) : W.C. Henderson et al.

It is certified that error appears in the above-identified patent and that said Letters Patent is hereby corrected as shown below:

| Column | Line | Error |
|---|---|---|
| 8 | 63 | "stimulating" should read --simulating-- |

Signed and Sealed this

Tenth Day of August, 1993

Attest:

MICHAEL K. KIRK

Attesting Officer    Acting Commissioner of Patents and Trademarks